Sept. 27, 1949.  L. KATZ  2,482,779
COMBINED CAN AND HEATER
Filed June 12, 1947
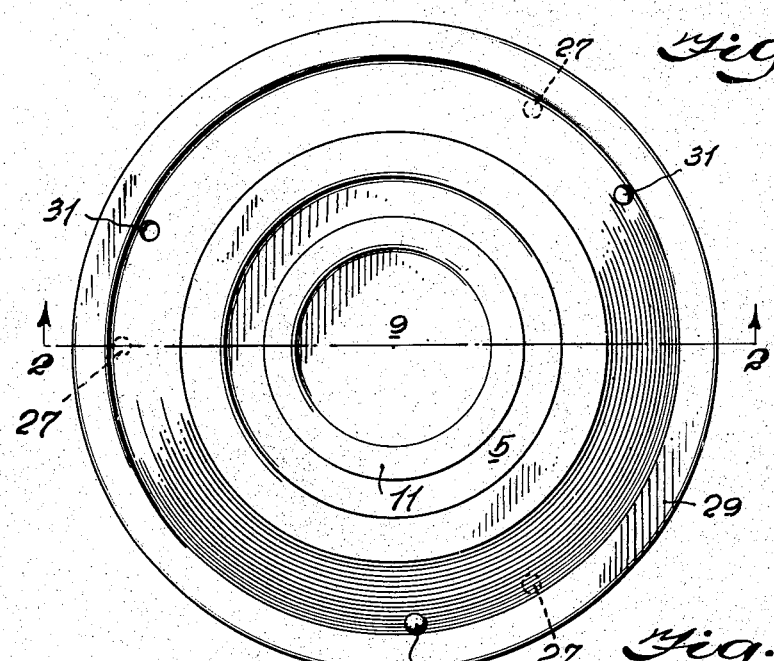
Fig. 1
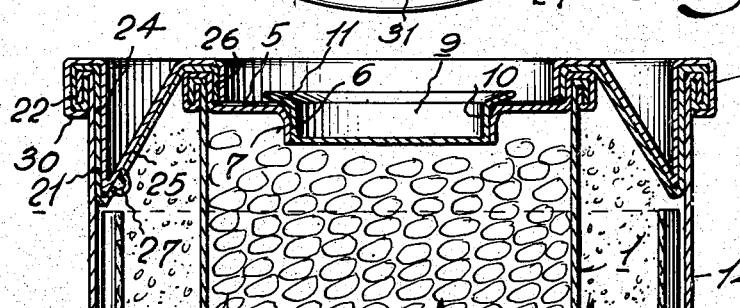
Fig. 2
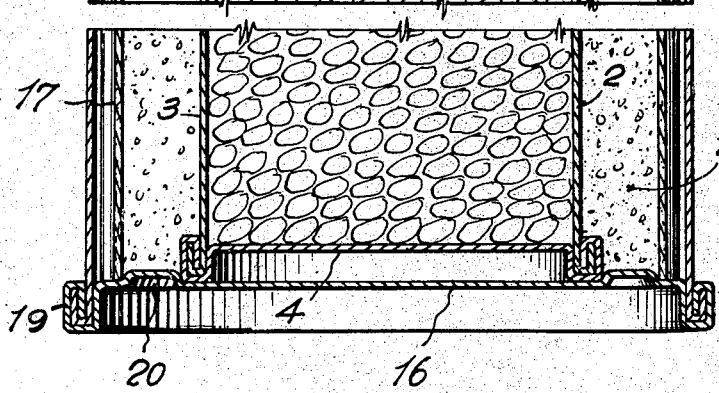
Fig. 3
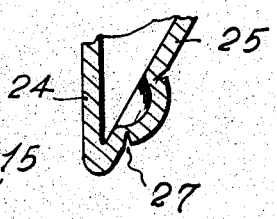
Inventor
Leo Katz,
By Sommers & Young
Attorneys Patented Sept. 27, 1949

2,482,779

UNITED STATES PATENT OFFICE 2,482,779

COMBINED CAN AND HEATER

Leo Katz, Los Angeles, Calif.

Application June 12, 1947, Serial No. 754,108

4 Claims. (Cl. 126—263)

1

This invention relates to improvements in fireless cookers or self-heating food containers, and particularly to arrangements whereby the food container can be readily opened and in which danger of contamination of the food by the heating substances is eliminated.

An object of this invention is to provide a self-heating food container which can be supplied with a liquid, such as water, for reaction with a chemical in an exothermic reaction, and which chemical can then be sealed off during the progress of the heating to prevent any possibility of the chemical leaking from the chemical compartment into contact with the parts of the container in which the food is located.

A further object of the invention is to provide a novel and more effective means for sealing the food compartment, but which can be readily opened without the necessity of a special tool, such as a can opener or the like.

Another object of the invention is to provide a self-heating container of the foregoing type and in which the food container which may be an ordinary can has one end accessible to be opened and the chemical compartment may be opened for the supply of liquid at the same end as the accessible end of the food container and in which a means is provided for again closing said end of the chemical compartment to prevent chemical from coming into contact with the accessible end of the can or with the food. The food container may be an ordinary metal can having its accessible end fully closed so as to require cutting by a can opener or the like for opening, or may have a special removable friction cover.

In the accompanying drawings an embodiment of the invention is represented merely by way of illustration, and it is to be understood that the patent is not to be considered as limited except as herein specified in the accompanying claims.

In the drawings;

Fig. 1 is a top end view of Fig. 2;

Fig. 2 is a partial vertical cross sectional view on the line 2—2 of Fig. 1 of a fireless cooker or self-heating food container according to the present invention; and Fig. 3 is an enlarged sectional view of a detail.

In the drawings, numeral 1 designates a can having side walls 2 and end walls 4 and 5 permanently attached to the sides by ordinary crimping at the edges. The bottom end wall 4 entirely closes said end, while the other or top end wall 5 has an opening 6, preferably of circular shape, formed therein. This opening has a downwardly turned flange 7 which tapers slightly inwardly. For closing the said opening after the food is packed in the container, a removable cover or closure member 9 is provided. This cover is slightly cupped and has substantially cylindrical side walls 10 of slightly larger diameter than the smaller diameter of the flange 7. Therefore, when the cover is inserted and pressed into the opening 6, the natural elasticity of the metal of the flange and cover causes a frictional gripping action which retains the cover in place and improves the seal between said members. The cover also has an outward and slightly upwardly extending rim 11 under which any suitable available member can be inserted for prying the cover from out of the opening 6.

Extending around and spaced outwardly from the food container is arranged a jacket member 14. The space between the side walls of the food container and the jacket provides a space or compartment for containing a chemical such as quicklime which gives off heat when water is placed in contact therewith. The lower end of the chemical compartment is closed by means of an end wall 16 of the chemical jacket secured to the side walls by intercrimping at 19, and said wall extends entirely across the bottom of the annular chemical compartment and of the food container in contact with the latter. For retaining the food container in proper position to provide the space for the chemical, that is, to prevent sideward movement of the food container, the bottom wall 16 of the chemical jacket may be provided with embossed protuberances or a ring 20 immediately adjacent the bottom edge of the food container.

At the upper end of the jacket a ring-shaped member 21 is secured to the side walls of the chemical jacket by intercrimping 22 and then extends downwardly along the inner face of the jacket for a considerable distance as indicated at 24, and then turns inwardly and upwardly at 25 and passes over the upper edge of the rim of the food container over which its inner edges are bent downwardly and to which it is sealed, as at 26. At one or more points, preferably located along the lowest portion of the inclined portion 25, the ring member is provided with small circular scorings 27 which are preferably also downwardly embossed. The scorings and embossings are shown in detail in section in Fig. 3. These scored portions are readily removable by punching with any suitable tool, and water can then be poured into the chemical compartment by filling the recess formed at the top by the shape of the ring member 21. For facilitating distribution of the water a generally cylindrical but corrugated piece of absorbent paper 17 can be provided in the chemical compartment 15. It will be observed that the openings in the chemical compartment through which the water or the like is supplied are located at the same end of the container as the opening 6 for access to the food in container 1, and thus the danger exists that some of the chemical might pass out through the small openings at 27 and possibly come into contact with the food when the cover 9 is removed. In order to prevent this, a rotatable ring member 29 is provided covering the ring-shaped end member 25. This rotatable outer ring member conforms in general to the shape of inner ring 25 but has its outer edges simply bent inwardly under the bulge of the crimping 22 as indicated at 30. The outer ring is thereby attached with sufficient looseness to enable it to be turned freely but will not become inadvertently detached, since the inwardly turned flange 30 prevents such detachment. The outer ring 29 is provided with one or more holes 31 which are so located as to be registerable with the scored or embossed portions 27 of the inner ring. When so in register an instrument of any suitable type can be inserted through the opening 31 and press the scored portions 27 downwardly, thus providing one or more openings through which water or the like may be poured into the chemical compartment to produce the exothermic reaction for heating the contents of the food container 1. When a sufficient amount of the liquid has passed into the chemical compartment, the outer ring member 29 may then be turned so that the openings 31 are out of register with the openings provided at 27, and therefore the chemical cannot pass outwardly through said openings but will be effectively sealed off. The user may then remove the cover 9 by inserting any flat implement under the flange 11 and prying same loose and the heating can proceed to the desired degree, when the food can be removed without any danger of contamination by the chemical which is effectively retained in the chemical compartment by the sealing ring 29.

I claim:

1. A self-heating container particularly for food comprising, a food receptacle, a cylindrical jacket surrounding said food receptacle in spaced relation thereto and forming a chemical compartment in the space between the food receptacle and said jacket, a ring extending from the upper edge of said jacket inwardly to the upper outer edge of the food receptacle, said ring being formed with a recess intermediate its inner and outer edges, and an outer ring secured over said first ring and substantially conforming in shape thereto, said outer ring being provided with an opening adjacent the bottom portion of the recess of said first ring to provide access to the first ring to allow puncturing thereof for supplying a liquid to the chemical compartment, said outer ring being rotatable so as to move its opening out of register with a puncture in said first ring, so as to seal off the puncture and prevent egress of chemical and eliminate danger of contamination of the food by the chemical.

2. A self-heating container particularly for food comprising, a food receptacle, a cylindrical jacket surrounding said food receptacle in spaced relation thereto and forming a chemical compartment in the space between the food receptacle and said jacket, the chemical compartment being closed at its upper end by a ring extending from the upper edge of said jacket inwardly to the upper outer edge of the food receptacle, said ring being formed with a recess intermediate its inner and outer edges, said ring being provided with an inwardly extending indenture adjacent the bottom of said recess adapted to facilitate puncturing of said ring, and an outer ring secured over said first ring and substantially conforming in shape thereto, said outer ring being provided with an opening adjacent the bottom portion of the recess of said first ring adapted to be brought into register with the indenture in the first ring to provide access thereto to allow puncturing thereof for supplying a liquid to the chemical compartment, said outer ring being rotatable so as to move its opening out of register with a puncture in said first ring, so as to seal off the puncture and prevent egress of chemical and eliminate danger of contamination of the food by the chemical.

3. A self-heating container particularly for food comprising, a food receptacle, a jacket surrounding said food receptacle in spaced relation thereto and forming a chemical compartment in the space between the food receptacle and said jacket, the upper end of said jacket being circular and being closed by a ring extending from the upper edge of said jacket inwardly to the upper edge of the food receptacle, said ring being formed with a recess intermediate its inner and outer edges, said ring being provided with a downwardly extending indenture adjacent the bottom of the recess, and said ring having a scoring encircling the indenture, said indenture and scoring serving to facilitate puncturing of said ring, an outer ring rotatably secured over said first ring and substantially conforming in shape thereto, said outer ring being provided with an opening adapted to be brought into register with the indenture in the first ring to provide access thereto to allow puncturing thereof for supplying a liquid to the chemical compartment, the rotatability of said outer ring serving to permit the opening to be moved out of register with a puncture formed in the first ring so as to seal off the puncture and prevent egress of chemical and eliminate danger of contamination of the food by the chemical.

4. A self-heating container particularly for food comprising, a food receptacle, a cylindrical jacket surrounding said food receptacle in spaced relation thereto and forming a chemical compartment in the space between the food receptacle and said jacket, a closure plate extending between an end portion of said jacket and an end portion of the receptacle leaving the said end of the food receptacle freely accessible for opening, said plate being formed with a recess for receiving a substance which reacts with the chemical exothermically, an outer plate extending over the first plate and conforming to the shape of the recess, said outer plate being provided with an opening adjacent the recess of the first plate for providing access to the first plate to permit puncture thereof for introducing said substance to the chemical compartment, said outer plate being movable relative to the first plate to bring said opening and a puncture out of register to seal off the puncture and prevent egress of chemical and eliminate danger of contamination of the food when the said end of the container is opened.

LEO KATZ.

REFERENCES CITED

The following references are of record in the file of this patent:

UNITED STATES PATENTS

| Number | Name | Date |
|---|---|---|
| 818,092 | Jewett | Apr. 17, 1906 |
| 862,151 | Friedman, et al. | Aug. 6, 1907 |
| 1,010,768 | Isaacs | Dec. 5, 1911 |
| 1,130,222 | Washtelschneider | Mar. 2, 1915 |
| 1,189,294 | Ruggles | July 4, 1916 |
| 1,971,364 | Zimmer, et al. | Aug. 28, 1934 |
| 2,265,172 | Katz | Dec. 9, 1941 |

FOREIGN PATENTS

| Number | Country | Date |
|---|---|---|
| 17,713 | Great Britain | 1907 |